(12) United States Patent
Chattopadhyay et al.

(10) Patent No.: US 11,762,889 B2
(45) Date of Patent: Sep. 19, 2023

(54) METHOD AND APPARATUS FOR IMPLEMENTING AN AUTOMATIC DATA INGESTION MODULE

(71) Applicant: JPMorgan Chase Bank, N.A., New York, NY (US)

(72) Inventors: Subhasish Chattopadhyay, Naperville, IL (US); Farrukh Jamil Farooqui, Aurora, IL (US); Mohammad Abuosbie, Oak Lawn, IL (US); Smitkumar Patel, Wheeling, IL (US); Steven L. Huang, Columbus, OH (US); Sejal K. Parmar, Naperville, IL (US); Tyler Spagnolo, Renfrew, PA (US); Omar Alayoubi, Chicago, IL (US); Arbaz Mirza, Chicago, IL (US)

(73) Assignees: JPMORGAN CHASE BANK, N.A., New York, NY (US); JPMORGAN CHASE BANK, N.A., New York, NY (US)

( * ) Notice: Subject to any disclaimer, the term of this patent is extended or adjusted under 35 U.S.C. 154(b) by 12 days.

(21) Appl. No.: 17/313,515

(22) Filed: May 6, 2021

(65) Prior Publication Data
US 2021/0349924 A1 Nov. 11, 2021

Related U.S. Application Data

(60) Provisional application No. 63/020,859, filed on May 6, 2020.

(51) Int. Cl.
*G06F 16/31* (2019.01)
*G06F 16/901* (2019.01)
*G06F 16/332* (2019.01)
*G06F 16/335* (2019.01)

(52) U.S. Cl.
CPC ............ *G06F 16/31* (2019.01); *G06F 16/332* (2019.01); *G06F 16/335* (2019.01); *G06F 16/9024* (2019.01)

(58) Field of Classification Search
CPC ...... G06F 16/31; G06F 16/332; G06F 16/335; G06F 16/9024
USPC .......................................... 707/741; 704/243
See application file for complete search history.

(56) References Cited

U.S. PATENT DOCUMENTS

| | | | |
|---|---|---|---|
| 11,068,819 B1* | 7/2021 | Peterson | G06Q 10/06315 |
| 2010/0114899 A1* | 5/2010 | Guha | G06F 16/9535 |
| | | | 707/E17.089 |
| 2012/0215535 A1* | 8/2012 | Wasserblat | G10L 15/26 |
| | | | 704/E15.001 |
| 2019/0130290 A1* | 5/2019 | Kerber | G06N 5/022 |

(Continued)

*Primary Examiner* — Giovanna B Colan
(74) *Attorney, Agent, or Firm* — GREENBLUM & BERNSTEIN, P.L.C.

(57) ABSTRACT

Various methods, apparatuses/systems, and media for implementing an automatic data ingestion module for automatically making data ingestion agnostic to source format are provided. A database stores a plurality of entity data each having a different file format. A processor configures each entity data accessed from the database via a communication network; automatically parses each of the configured entity data; splits and converts the parsed entity data of different file formats into a single file format; and translate the single file formatted entity data into a graph database form for further processing and analysis.

9 Claims, 6 Drawing Sheets

(56) References Cited

U.S. PATENT DOCUMENTS

| | | | |
|---|---|---|---|
| 2019/0287032 A1* | 9/2019 | Seabolt | G06Q 50/265 |
| 2020/0004759 A1* | 1/2020 | Brebner | G06F 8/10 |
| 2020/0034336 A1* | 1/2020 | Haddad | G06F 9/455 |
| 2020/0073990 A1* | 3/2020 | Wang | G06F 16/13 |
| 2020/0211077 A1* | 7/2020 | He | G06F 40/20 |
| 2020/0252404 A1* | 8/2020 | Padmanabhan | G06F 16/2308 |
| 2020/0252406 A1* | 8/2020 | Padmanabhan | H04L 9/0891 |
| 2020/0265325 A1* | 8/2020 | Gabaldon Royval | G06F 16/367 |
| 2020/0341951 A1* | 10/2020 | Oberhofer | G06F 16/254 |
| 2021/0103827 A1* | 4/2021 | Quamar | G06F 16/9024 |
| 2021/0185066 A1* | 6/2021 | Shah | G06N 3/08 |

\* cited by examiner

METHOD AND APPARATUS FOR IMPLEMENTING AN AUTOMATIC DATA INGESTION MODULE

CROSS-REFERENCE TO RELATED APPLICATIONS

This application claims the benefit of priority from U.S. Provisional Patent Application No. 63/020,859, filed May 6, 2020, which is herein incorporated by reference in its entirety.

TECHNICAL FIELD

This disclosure generally relates to automatic ingestion of data, and, more particularly, to methods and apparatuses for implementing an automatic data ingestion module for automatically making data ingestion agnostic to source format.

BACKGROUND

The developments described in this section are known to the inventors. However, unless otherwise indicated, it should not be assumed that any of the developments described in this section qualify as prior art merely by virtue of their inclusion in this section, or that those developments are brown to a person of ordinary skill in the art.

Today's corporations, agencies, institutions, and other organizations are facing a continuing problem of handling and processing a vast amount of data having differing formats (e.g., xml, JSON, mainframe, etc.) in a quick and expedited manner. The vast amount of data often received on a daily basis may be now stored electronically and may need to be analyzed by a variety of persons within the organization relative to business or organizational goals. Each day, a data loader may load millions of data (e.g., entity data) having multiple formats which may require coding (and recoding when any changes occur to the data) for processing and analysis. The need to determine efficiently what data may be available for analysis and how to analyze disparate data across organizational management boundaries may prove to be extremely time consuming and confusing as the data being tracked increases and as organizations implement more specialized or distributed functions. Managers, executives, employees, and other personnel, each with possibly differing needs for particular content and detail, may often need to analyze how different changes might affect the presentations of projects, products, resources, finances, assets, and authorized data exchange that each are responsible for. Moreover, different data file may require different load and coding effort. Conventional data extraction and ingestion systems neither provide visibility during runtime nor provide visibility to the data lineage. In addition, conventional data extraction and ingestion systems may not be configured to define common or canonical data model for common entities across ling of business (LOBs) adding further difficulties in processing and analyzing data having various formats.

SUMMARY

The present disclosure, through one or more of its various aspects, embodiments, and/or specific features or sub-components, may provide, among others, various systems, servers, devices, methods, media, programs, and platforms for implementing an automatic data ingestion module for automatically making data ingestion agnostic to source format thereby automatically triggering execution of a single platform for processing a vast amount of data having differing formats in a quick and expedited manner i.e., within seconds, but the disclosure is not limited thereto. In addition, the present disclosure, through one or lore of its various aspects, embodiments, and/or specific features or sub-components, may further provide, among others, various systems, servers, devices, methods, media, programs, and platforms for implementing a versatile platform to ingest and analyze data from different lines of businesses, but the disclosure is not limited thereto. According to context of the exemplary embodiments of the instant disclosure, converting ingested data having various formats into a single file format significantly reduces size of data for analysis and storage thereby lowering the storage requirements of a database.

According to an aspect of the present disclosure, a method for implementing an automatic data ingestion module for automatically making data ingestion agnostic to source format by utilizing one or more processors and one or more memories is disclosed. The method may include: providing a database that stores a plurality of entity data each having a different file format; configuring each entity data accessed from the database via a communication network; automatically parsing each of the configured entity data; splitting and converting the parsed entity data of different file formats into a single file format; and translating the single file formatted entity data into a graph database form for further processing and analysis.

According to another aspect of the present disclosure, the method may further include: configuring each entity data from multiple data types without coding for each load.

According to yet another aspect of the present disclosure, the method may further include: defining a canonical data model for common entities across line of businesses (LOBs).

According to further aspect of the present disclosure, the method may further include: splitting and cony the parsed entity data of different file formats into a single JSON file format; and translating the single JSON file formatted entity data into the graph database form for further processing and analysis.

According to yet another aspect of the present disclosure, the method may further include: providing a single data loader for all data types by implementing a common load process and common rules for all data types, thereby significantly improving processor's speed in data analysis processing.

According to an additional aspect of the present disclosure, the method ay further include: splitting the parsed entity data of different file formats by applying a predefined process to separate data ingestion process from application processing interfaces.

According to yet another aspect of the present disclosure, the predefined process may include applying custom apache NiFi processes, and the method may further include: building a common datastore model for all data types; designing and defining the NiFi process groups and workflows; enforcing audit logging; and configuring role based NiFi dashboard, but the disclosure is not limited to the custom apache NiFi processes.

According to another aspect of the present disclosure, a system for implementing an automatic data ingestion module for automatically making data ingestion agnostic to source format is disclosed. The system may include a database that stores a plurality of entity data each having a different data file format and a processor that is coupled to the database via a communication network. The processor may be configured to: configure each entity data accessed from the database via the communication network; automatically parse each of the configured entity data; split and convert the parsed entity data of different file formats into a single format; and translating the single file formatted entity data into a graph database form for further processing and analysis.

According to another aspect of the present disclosure, the processor may further configure each entity data from multiple data types without coding for each load.

According to yet another aspect of the present disclosure, the processor may be further configured to: define a canonical data model for common entities across line of businesses (LOBs).

According to further aspect of the present disclosure, the processor may be further configured to: split and convert the parsed entity data of different file formats into a single JSON file format; and translate the single JSON file formatted entity data into the graph database form for further processing and analysis.

According to yet another aspect of the present disclosure, the processor may be further configured to implement a single data loader for all data types by implementing a common load process and common rules for all data types, thereby significantly improving processor's speed in data analysis processing.

According to an additional aspect of the present disclosure, the processor may be further configured to: split the parsed entity data of different file formats by applying a predefined process to separate data ingestion process from application processing interfaces.

According to yet another aspect of the present disclosure, the predefined process may include applying custom apache NiFi processes, and the processor may be further configured to: build a common datastore model for all data types; designing and defining the NiFi process groups and workflows; enforce audit logging; and configure role based NiFi dashboard, but the disclosure is not limited to the custom apache NiFi processes.

According to another aspect of the present disclosure, a non-transitory computer readable medium configured to store instructions for implementing an automatic data ingestion module for automatically making data ingestion agnostic to source format is disclosed. The instructions, when executed, may cause a processor to perform the following: accessing a database that stores a plurality of entity data each having a different file format; configuring each entity data accessed from the database via a communication network; automatically parsing each of the configured entity data; splitting and converting the parsed entity data of different file formats into a single file format; and translating the single file formatted entity data into a graph database form for further processing and analysis. According to another aspect of the present disclosure, the method may further include: configuring each entity data from multiple data types without coding for each load.

According to yet another aspect of the present disclosure, wherein, when executed, the instructions may further cause the processor to define a canonical data model for common entities across line of businesses (LOBs).

According to further aspect of the present disclosure, wherein, when executed, the instructions may further cause the processor to: split and convert the parsed entity data of different file formats into a single JSON file format; translate the single JSON file formatted entity data into the graph database form for further processing and analysis.

According to yet another aspect of the present disclosure, wherein, when executed, the instructions may further cause the processor to implement a single data loader for all data types by implementing a common load process and common rules for all data types, thereby significantly improving processor's speed in data analysis processing.

According to an additional aspect of the present disclosure, wherein, when executed, the instructions may further cause the processor to: split the parsed entity data of different file formats by applying a predefined process to separate data ingestion process from application processing interfaces.

According to yet another aspect of the present disclosure, the predefined process may dude applying custom apache NiFi processes, and wherein, when executed, the instructions may further cause the processor to: build a common datastore model for all data types; design and define the NiFi process groups and workflows; enforce audit logging; and configure role based NiFi dashboard, but the disclosure is not limited to the custom apache NiFi processes.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
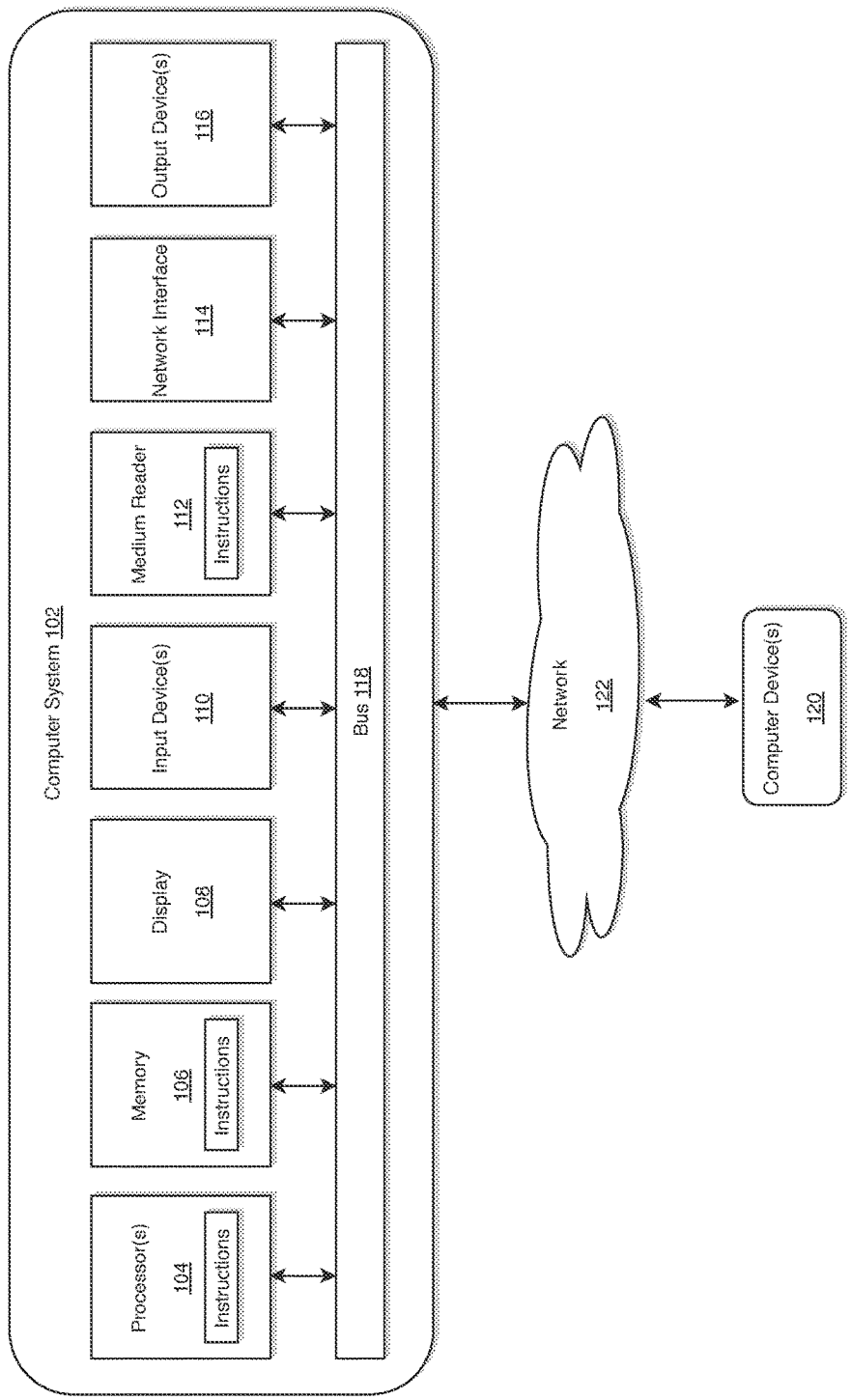
FIG. 1 illustrates a computer system for implementing an automatic data ingestion device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated intra two or inure interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deploy rent, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in airy place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or arty combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described her may be used to support a virtual processing environment.

As described herein, various embodiments provide optimized processes of implementing an automatic data ingestion module for automatically making data ingestion agnostic to source format thereby automatically triggering execution of a single platform for processing a vast amount of data having different file formats in a quick and expedited manner i.e., within seconds, but the disclosure is not limited thereto. As described herein, various embodiments may further provide optimized processes of implementing a versatile single platform to automatically ingest and analyze data from different lines of businesses, but the disclosure is not limited thereto. According to the context of the exemplary embodiments of the instant disclosure, converting ingested data having various file formats into a single file format may significantly reduce size of data for analysis and storage thereby lowering the storage requirements of a database. According to exemplary embodiments, the database may be a graph database, but the disclosure is not limited thereto.

Figure 2:
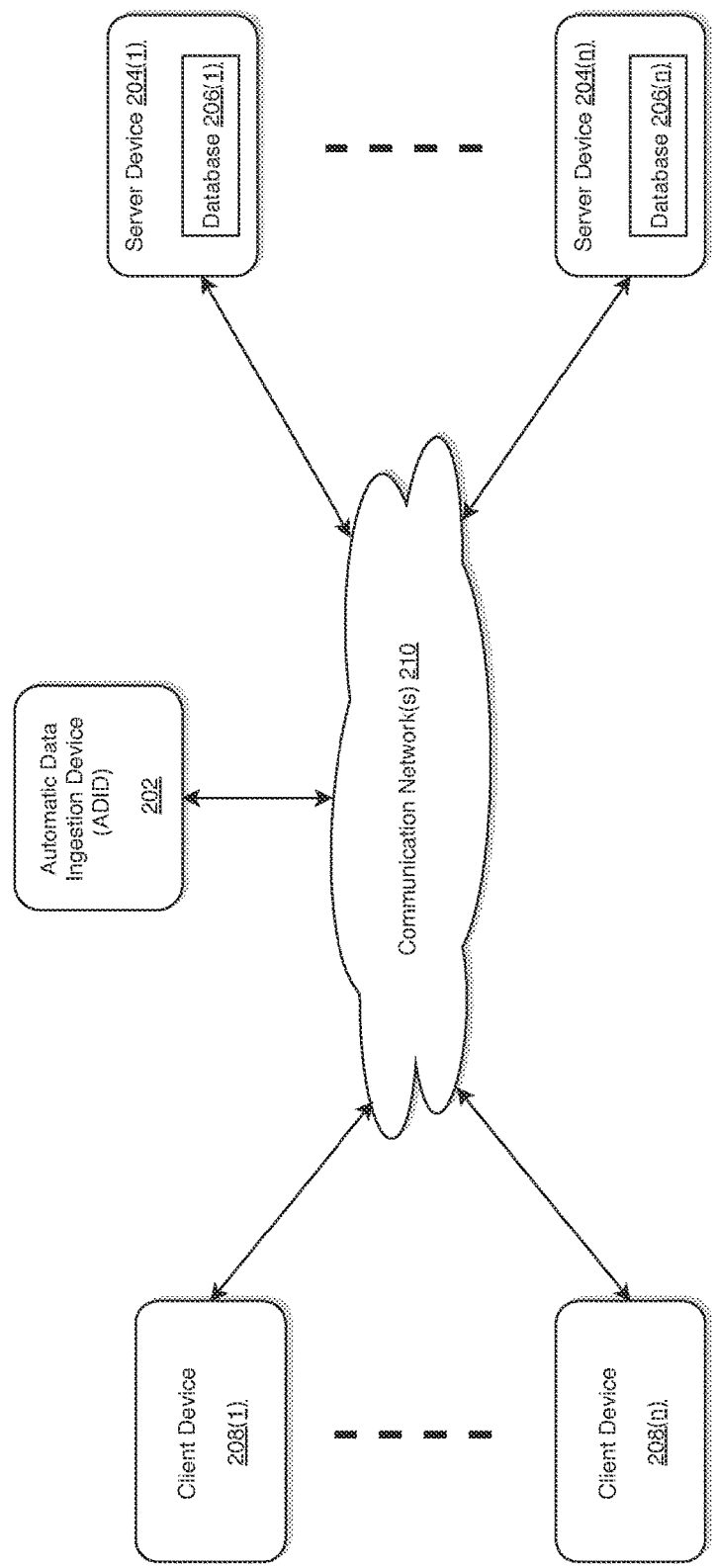
FIG. 2 illustrates an exemplary diagram of a network environment with an automatic data ingestion device in accordance with an exemplary embodiment.

Referring to FIG. 2, a schematic of an exemplary network environment 200 for implementing an automatic data ingestion device (ADID) of the instant disclosure is illustrated.

Conventional system, that does not implement an ADID of the instant disclosure, may not be able to handle and process a vast amount of data having differing formats (e.g., xml, JSON, mainframe, etc.) in a quick and expedited manner. For example, conventional data extraction and ingestion systems that does not implement an ADID of the instant disclosure may neither provide visibility during runtime provide visibility to the data lineage. In addition, conventional data extraction and ingestion systems that does not implement an ADID of the instant disclosure, may not be configured to define common or canonical data model for common entities across ling of business (LOBs) adding further difficulties in processing and analyzing data having various formats.

According to exemplary embodiments, the above-described problems associated with conventional system may be overcome by implementing an ADID 202 having an automatic data ingestion module as illustrated in FIG. 2 by i) ingesting entity data from multiple SoRs without coding for each load; ii) automatically generating a single framework for data ingestion by implementing common load process, common rules, and providing data traceability process, audit capabilities, and dashboard; iii) automatically generating and implementing predefined canonical entity model for better enforcement of LOB specific client visibility; PI data security enforcement, business model and data visibility; quick and accurate change impact analysis; and iv) implementing modular and separate technology modules to handle data load process, data conversions/masking, data ingestion inside CPD (client profile data), data load not impacting performance of API, but the disclosure is not limited thereto.

The ADID 202 may be the same or similar to the computer system 102 as described with respect FIG. 1.

The ADID 202 may store one or lore applications that can include executable instructions that, when executed by the ADID 202, cause the ADID 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADID 202 itself, may be located in virtual server(s) running in a cloud-based computing environment rather than being tied to one or more specific physical network computing devices. Also, the application(s) may be running in one or more virtual machines (VMs) executing on the ADID 202. Additionally, in one or more embodiments of this technology, virtual machine(s) running on the ADID 202 may be managed or supervised by a hypervisor.

In the network environment 200 of FIG. 2, the ADID 202 is coupled to a plurality of server devices 204(1)-204(n) that hosts a plurality of databases 206(1)-206(n), and also to a plurality of client devices 208(1)-208(n) via communication work(s) 210. A communication interface of the ADID 202, such as the network interface 114 of the computer system 102 of FIG. 1, operatively couples and communicates between the ADID 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADID 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ADID 202 may be a standalone device or integrated with one or more other devices or apparatuses, such as one or more of the server devices 204(1)-204(n), for example. In one particular example, the ADID 202 may be hosted by one of the server devices 204(1)-204(n), and other arrangements are also possible. Moreover, one or more of the devices of the ADID 202 may be in a same or a different communication network including one or e public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of k devices may be used. The server devices 204(1)-204(n) in this example may process requests received from the ADID 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including airy features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ADID 202 that may be configured for defining a common/canonical date model for common entities across LOBs, understanding the PI attributes and defining masking style, understanding and imposing data visibility rules/metadata and providing dashboard for configuration and audit capabilities for support, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the ADID 202 via the communication network(s) 210 in order to communicate user requests. The client devices 208(1)-208(n) may further include, among other features, a display device, such as a display screen touchscreen, and/or an input device, such as a keyboard, for example.

Although the exemplary network environment 200 with the ADID 202, the server devices 204(1)-204(n), the client devices 208(1)-208(n), and the communication network(s) 210 are described and illustrated herein, other types and/or numbers of systems, devices, components, and/or elements in other apologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADID 202, the server devices 204(1)-204(n), or the client devices 208(1)-208(n), for example, may be configured to operate as virtual instances on the same physical machine. For example, one or more of the ADID 202, the server devices 204(1)-204(n), or the client devices 208(1)-208(n) may operate on the same physical device rather than as separate devices communicating through communication networks) 210. Additionally, there may be more or fewer ADIDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
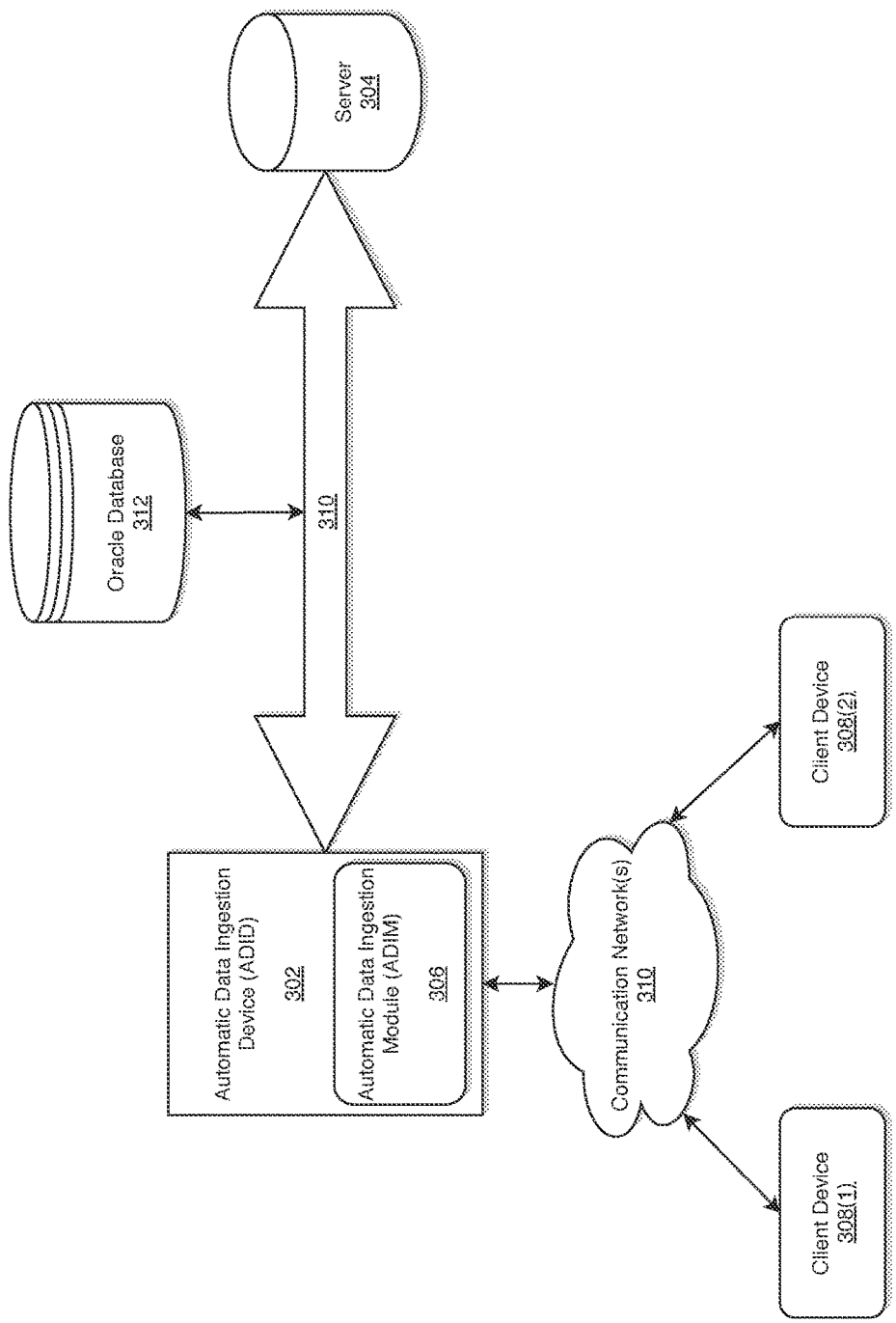
FIG. 3 illustrates a system diagram for implementing an automatic data ingestion device with an automatic data ingestion module in accordance with an exemplary embodiment.

FIG. 3 illustrates a system diagram for implementing an ADID with an automatic data ingestion module (ADIM) in accordance with an exemplary embodiment.

As illustrated in FIG. 3, according to exemplary embodiments, the system 300 may include an ADID 302 including an ADIM 306 that may be connected to a server 304 and an Oracle database 312 via a communication network 310, but the disclosure is not limited thereto. For example, according to exemplary embodiments, the ADIM 306 may be connected to any desired database besides Oracle database. The ADID 302 may also be connected to a first client device 308(1) and a second client device 308(2) via the communication network 310, but the disclosure is not limited thereto.

According to exemplary embodiment, the ADID 302 is described and shown in FIG. 3 as including the ADIM 306, although it may include other rules, policies, modules, databases, or applications, for example. According to exemplary embodiments, the Oracle database 312 may be embedded within the ADM 302. According to exemplary embodiments, the server 304 may also be a database which may be configured to store information including a plurality of entity data each having a different file format, but the disclosure is not limited thereto.

According to exemplary embodiments, the ADIM 306 may be configured to receive: continuous feed of data from the server 304 and the Oracle database via the communication network 310.

As will be described below, the ADM 306 may be configured to access a database that stores a plurality of entity data each having a different file format; configure each entity data accessed from the database via a communication network; automatically parse each of the configured entity data; split and convert the parsed entity data of different file formats into a single file format; and translate the single file formatted entity data into a graph database form for further processing and analysis, and output the graph of entity data to a graphical user interface (GUI) embedded with the client device 308(1) or the client device 308(2).

The first client device 308(1) and the second client device 308(2) are illustrated as being in communication with the ADID 302. In this regard, the first client device 308(1) and the second client device 308(2) may be "clients" of the ADID 302 and are described herein as such. Nevertheless, it is to be known and understood that the first client device 308(1) and/or the second client device 308(2) need not necessarily be "clients" of the ADID 302, or any entity described in association therewith herein. Any additional or alternative relationship may exist between either or both of the first client device 308(1) and the second client device 308(2) and the ADID 302, or no relationship may exist.

The first client device 308(1) may be, for example, a smart phone. Of course, the first client device 308(1) may be any additional device described herein. The second client device 308(2) may be, for example, a personal computer (PC). Of course, the second client device 308(2) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either or both of the first client device 308(1) and the second client device 308(2) may communicate with the ADID 302 via broadband or cellular communication. Of course, these embodiments are merely exemplary and are not limiting or exhaustive.

Figure 4:
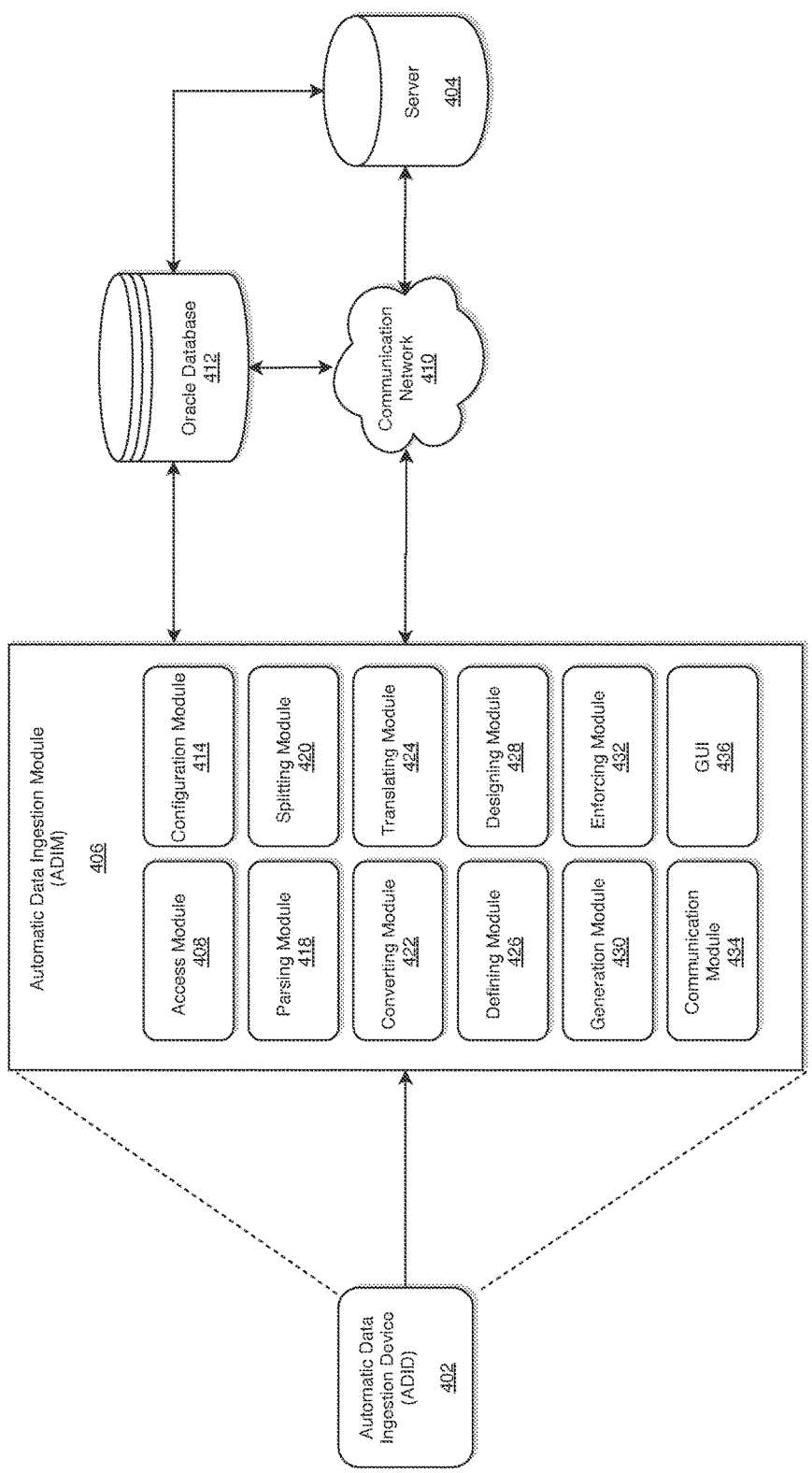
FIG. 4 illustrates a system diagram for implementing an automatic data ingestion module of FIG. 3 in accordance with an exemplary embodiment.

FIG. 4 illustrates a system diagram for implementing an automatic data ingestion module of FIG. 3 in accordance with an exemplary embodiment. As illustrated in FIG. 4, the system 400 may include an ADID 402 within which an ADIM 406 may be embedded, an Oracle database 412, a server 404, and a communication network 410.

As illustrated in FIG. 4, the ADIM 406 may include an access module 408, a configuration module 414, a parsing module 418, a splitting module 420, a converting module 422, a translating module 424, a defining module 426, a designing module 428, a generation module 430, an enforcing module 432, a communication module 434, and a GUI 436. According to exemplary embodiments, the Oracle database 412 may be external to the ADID 402 and the ADID 402 may include various systems that are managed and operated by an organization.

The process may be executed via the communication network 410, which may comprise plural networks as described above. For example, in an exemplary embodiment, the various components of the ADIM 406 may communicate with the server 404, and the Oracle database 412 via the communication module 434 and the communication network 410. Of course, these embodiments are merely exemplary and are not limiting or exhaustive.

According to exemplary embodiments, the communication module 434 may be configured to establish a link between the Oracle database 412 via the communication network 410.

According to exemplary embodiments, each of the access module 408, the configuration module 414, the parsing module 418, the splitting module 420, the converting module 422, the translating module 424, the defining module 426, the designing module 428, the generation module 430, the enforcing module 432, and the communication module 434 may be implemented by microprocessors or similar, they may be programmed using software (e.g., microcode) to perform various functions discussed herein and ninny optionally be driven by firmware and/or software. Alternatively, each of the access module 408, the configuration module 414, the parsing module 418, the splitting module 420, the converting module 422, the translating module 424, the defining module 426, the designing module 428, the generation module 430, the enforcing module 432, and the communication module 434 may be implemented by dedicated hardware, or as a combination of dedicated hardware to perform some functions and a processor (e.g., one or more programmed microprocessors and associated circuitry) to perform other functions. Also, according to exemplary embodiments, each of the access module 408, the configuration module 414, the parsing module 418, the splitting module 420, the converting module 422, the translating module 424, the defining module 426, the designing module 428, the generation module 430, the enforcing module 432, and the communication module 434 may be physically separated into two or more interacting and discrete blocks, units, devices, and/or modules without departing from the scope of the inventive concepts.

According to exemplary embodiments, the access module 408 may be configured to access the server 404 and ingest a plurality of entity data each having a different file format. The configuration module 414 may be configured to configure each entity data accessed from the server 404 via the communication network 410.

According to exemplary embodiments, the parsing module 418 may be configured to automatically parse each of the configured entity data configured by the configuration module 414 and the splitting module 420 may the configured to split e configured entity data.

According to exemplary embodiments, the converting module may be configured to convert the parsed entity data of different file formats into a single file format and the translating module 424 may be configured to translate the single file formatted entity data into a graph database form for further processing and analysis. According to exemplary embodiments, the graph database form may include a form that is compatible for the Oracle database 412, but the disclosure is not limited thereto. For example, the translating module 424 may be configured to translate the single file formatted entity data into any other graph database form besides Oracle database depending on user's desire for further processing and analysis.

According to exemplary embodiments, the configuration module 422 may be configured to configure each entity data from multiple data types without coding for each load.

According to exemplary embodiments, the defining module 426 may be configured to define a canonical data model for common entities across line of businesses (LOBs).

According to exemplary embodiments, the splitting module 420 and the converting module 422 may be configured to split and convert the parsed entity data of different file formats into a single JSON file format, but the disclosure is not limited thereto. For example, the splitting module 420 and the converting module 422 may be configured to split and convert the parsed entity data of different file formats into the same single file format other than JSON file format. According to exemplary embodiments, the translating module 424 may be configured to translate the single JSON file formatted entity data into the graph database form for further processing and analysis.

According to exemplary embodiments, the ADIM 406 may be configured to provide a single data loader for all data types by implementing a common load process and common rules for all data types, thereby significantly improving processor's speed in data analysis processing.

According to exemplary embodiments, the splitting module 420 may be configured to split the parsed entity data of different file formats by applying a predefined process to separate data ingestion process from application processing interfaces (APIs).

According to exemplary embodiments, the predefined process may include applying custom apache NiFi processes, and the generation module 430 may be configured to generate a common datastore model for all data types; designing module 428 may be configured to design the NiFi process groups and workflows and the defining module 426 may be configured to define the NiFi process groups and workflows; the enforcing module 432 may be configured to enforce audit logging; and the configuration module 422 may be configured to configure role based NiFi dashboard, but the disclosure is not limited to the custom apache NiFi processes.

Figure 5:
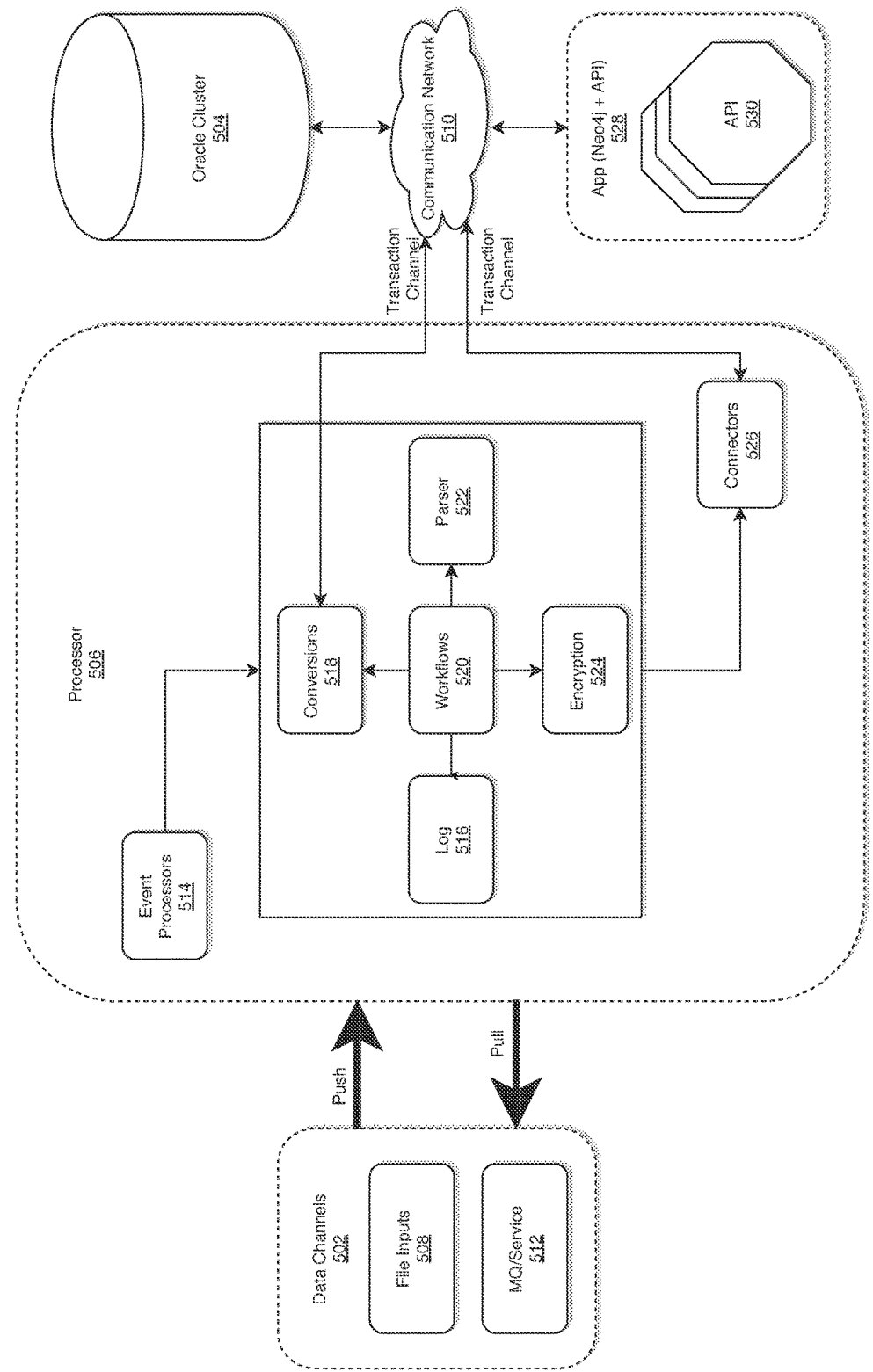
FIG. 5 illustrates a system diagram showing an exemplary process flow in generating a graph by implementing an automatic data ingestion module of FIG. 4 in accordance with an exemplary embodiment.

FIG. 5 illustrates a system diagram showing an exemplary process flow in generating a graph by implementing an automatic data ingestion module of FIG. 4 in accordance with an exemplary embodiment.

As illustrated in FIG. 5, the system 500 may include data channels 502, a processor 506, an Oracle cluster 504, an application 528 and a communication network 510. According to exemplary embodiments, the data channels 502 may provide data (i.e., entity data) from file inputs 508 and MQ/Service 512 to the processor 506 by utilizing push and pull techniques.

According to exemplary embodiments, the processor 506 may include event processors 514, a log module 516, conversions module 518, workflows module 520, parser module 522, encryption module 524, and connectors 526. According to exemplary embodiments, the conversions (nodule 518 may be connected to the Oracle cluster 504 via the transaction channel and the communication network 510 and the connectors 526 may be connected to the application 528 via the transaction channel and the communication network 510.

According to exemplary embodiments, the processor 506 may be implemented as an automatic data ingestion module as illustrated in FIGS. 3-4 by i) ingesting entity data from multiple file inputs 508 and MQ/Service 512 without coding for each load; ii) automatically generating a single framework for data ingestion by implementing common load process, common rules, and providing data traceability process, audit capabilities, and dashboard; iii) automatically generating and implementing predefined canonical entity model for better enforcement of LOB specific client visibility, PI data security enforcement, business model and data visibility; quick and accurate change impact analysis; and iv) implementing modular and separate technology modules to handle data load process, data conversions/masking by the conversions module 518, data ingestion inside CPD (client profile data), data load not impacting performance of APIs 530, but the disclosure is not limited thereto.

According to exemplary embodiments, the processor 506 may be a custom apache NiFi processor that may be configured to separate data ingestion process from APIs 530, but the disclosure is not limited thereto.

According to exemplary embodiments, the processor 506 may be further configured to convert current implementations to Nifi processors by utilizing the conversions module 518, designing and defining the NiFi "process groups"/workflows by utilizing the workflows module 520, enforcing audit logging by utilizing the log module 516, configuring role based Nifi dashboard by utilizing the workflows module 520, parser module 522 and the encryption module 524. The event processors 514 may process events as data is input to the processor 506 from the file inputs 508 and MQ/Service 512.

According to exemplary embodiments, the processor 506 may be configured to translate a single JSON file formatted entity data into a graph database form and store it onto the Oracle cluster 504 for further processing and analysis. According to exemplary embodiments, the data may be read from the Oracle cluster 504 when it becomes available for processing. After that the processor 506 may be configured to transform the data from original file data to nodes and relations and load the data to a graph database. According to exemplary embodiments, the graph database may be a Neo4j database.

According to exemplary embodiments, the processor 506 may be configured to batch process based on data provided by the event processors 514 for faster, manageable data movement.

According to exemplary embodiments, the processor 506 may also be configured to implement modularity which may allow for the ingestion process to act independently in the event of other system failures. Modularity allows services to be updated and scaled independently (horizontal and vertical scalability).

According to exemplary embodiments, the system 500 may e configured for dynamic features to encompass all types of file data (i.e. Client, Account, Case, etc.).

According to exemplary embodiments, the processor 506 may be configured to implement a versatile platform to ingest and analyze data from different LOBS, thereby improving analysis process of highly-related data, effecting dynamic flow to handle multiple types of files, improving time efficient development for querying data, effecting easy maintenance and update through customizable processors.

Figure 6:
FIG. 6 illustrates a flow chart for implementing an automatic data ingestion module in accordance with an exemplary embodiment.

FIG. 6 illustrates a flow chart for implementing an automatic data ingestion module for automatically making data ingestion agnostic to source format by utilizing one or more processors and one or more memories in accordance with an exemplary embodiment.

It will be appreciated that the illustrated process 600 and associated steps may be performed in a different order, with illustrated steps omitted, with additional steps added, or with a combination reordered, combined, omitted, or additional steps.

In the process 600 of FIG. 6, at step S602, a database may be provided that stores a plurality of entity data each having a different file format. At step S604, each entity data accessed from the database via a communication network may be configured. At step S606, each of the configured entity data may be automatically parsed. At step S608, the parsed entity data of different file formats may be split and converted into a single file format. At step S610, the single file formatted entity data may be translated into a graph database form for further processing and analysis. At step S612, a canonical data model for common entities across line of businesses (LOBs) may be defined. At step S614, a graph of entity data based on the single file formatted entity data may be generated.

According to exemplary embodiments, the process 600 may further include: include: splitting and converting the parsed entity data of different file formats into a single JSON file format; and translating the single JSON file formatted entity data into the graph database form for further processing and analysis.

According to exemplary embodiments, the process 600 may further include: providing a single data loader for all data types by implementing a common load process and common rules for all data types, thereby significantly improving data analysis processing.

According to exemplary embodiments, the process 600 may further include: splitting the parsed entity data of different file formats by applying a predefined process to separate data ingestion process from application processing interfaces.

According to exemplary embodiments, the predefined process may include applying custom apache NiFi processes, and the process 600 may further include: building a common datastore model for all data types; designing and defining the NiFi process groups and workflows; enforcing audit logging; and configuring role based NiFi dashboard, but the disclosure is not limited to the custom apache NiFi processes.

According to exemplary embodiments, a non-transitory computer readable medium may be configured to store instructions for implementing the ADIM 406 for automatically extracting information from unstructured data. According to exemplary embodiments, the instructions, when executed, may cause a processor embedded within the ADIM 406 or the ADID 402 to perform the following: accessing a database that stores a plurality of entity data each having a different file format; configuring each entity data accessed from the database via a communication network; automatically parsing each of the configured entity data; splitting and converting the parsed entity data of different file formats into a single file format; and translating the single file formatted entity data into a graph database form for further processing and analysis. The processor may be the same or similar to the processor 104 as illustrated in FIG. 1 or the processor embedded within ADID 202, ADID 302, ADID 402, and ADIM 406.

According to exemplary embodiments, wherein, when executed, the instructions may further cause the processor 104 to define a canonical data model for common entities across line of businesses (LOBs).

According to exemplary embodiments, wherein, when executed, the instructions may further cause the processor 104 to: split and convert the parsed entity data of different file formats into a single JSON file format; and translate the single JSON file formatted entity data into the graph database form for further processing and analysis.

According to exemplary embodiments, wherein, when executed, the instructions may further cause the processor 104 to implement a single data loader for all data types by implementing a common load process and common rules for all data types, thereby significantly improving processor's speed in data analysis processing.

According to exemplary embodiments, wherein, when executed, the instructions may further cause the processor 104 to: split the parsed entity data of different file formats by applying a predefined process to separate data ingestion process from application processing interfaces.

According to exemplary embodiments, the predefined process may include applying custom apache NiFi processes, and wherein, when executed, the instructions may further cause the processor 104 to: build a common datastore model for all data types; design and define the NiFi process groups and workflows; enforce audit logging; and configure role based NiFi dashboard, but the disclosure is not limited to the custom apache NiFi processes.

According to exemplary embodiments as disclosed above in FIGS. 1-6, technical improvements effected by the instant disclosure may include platforms for implementing an automatic data ingestion module for automatically making data ingestion agnostic to source format thereby automatically triggering execution of a single platform for processing a vast amount of data having differing formats in a quick and expedited manner i.e., within seconds, but the disclosure is not limited thereto. In addition, according to exemplary embodiments as disclosed above in FIGS. 1-6, technical improvements effected by the instant disclosure may include platforms for implementing a versatile platform to ingest and analyze data from different lines of businesses, but the disclosure is not limited thereto. Further, according to exemplary embodiments as disclosed above in FIGS. 1-16, technical improvements effected by the instant disclosure may include converting ingested data having various formats into a single file format significantly reduces size of data for analysis and storage thereby lowering the storage requirements of a database.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access me or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an automatic data ingestion module for automatically making data ingestion agnostic to source format by utilizing one or more processors and one or more memories, the method comprising:
   providing a database that stores a plurality of entity data each having a different file format;
   configuring each entity data accessed from the database via a communication network;
   configuring each entity data from multiple data types without coding for each load;
   defining a canonical entity model for common entities across line of businesses (LOBs);
   implementing a common load process, common rules, a data traceability process, audit capabilities, and a dashboard and automatically generating, in response to implementing, a single framework and ingesting data from the single framework;
   for each of LOB specific client visibility enforcement, personal information (PI) data security enforcement, business model and data visibility, and change impact analysis, automatically generating and implementing the defined canonical entity model;
   for each of data load process, data conversions/masking, data ingestion inside CPD (client profile data), and data load not impacting performance of API, implementing modular and separate technology modules;
   ingesting data independently, in response to implement modular and separate technology modules, regardless of other system failures;
   automatically parsing each of the configured entity data;
   splitting the parsed entity data of different file formats by applying a predefined;
   separating, in response to splitting, data ingestion process from application processing interfaces;
   converting the parsed entity data of different file formats into a single file format by transforming each entity data from original file data to nodes and relations; and
   translating the single file formatted entity data into a graph database form for further processing and analysis.

2. The method according to claim 1, further comprising:
   splitting and converting the parsed entity data of different file formats into a single JSON file format; and
   translating the single JSON file formatted entity data into the graph database form for further processing and analysis.

3. The method according to claim 1, wherein the predefined process includes applying custom apache NiFi processes, and the method further comprising:
   building a common datastore model for all data types;
   designing and defining the NiFi process groups and workflows;
   enforcing audit logging; and
   configuring role based NiFi dashboard.

4. A system for implementing an automatic data ingestion module for automatically making data ingestion agnostic to source format, the system comprising:
   a database that stores a plurality of entity data each having a different data file format; and
   a processor coupled to the database via a communication network, wherein the processor is configured to:
      configure each entity data accessed from the database via the communication network;
      configure each entity data from multiple data types without coding for each load;
      define a canonical entity model for common entities across line of businesses (LOBs);
      implement a common load process, common rules, a data traceability process, audit capabilities, and a dashboard and automatically generate, in response to implement, a single framework and ingest data from the single framework;
      for each of LOB specific client visibility enforcement, personal information (PI) data security enforcement, business model and data visibility, and change impact analysis, automatically generate and implement the defined canonical entity model;
      for each of data load process, data conversions/masking, data ingestion inside CPD (client profile data), and data load not impacting performance of API, implement modular and separate technology modules;
      ingest data independently, in response to implement modular and separate technology modules, regardless of other system failures;
      automatically parse each of the configured entity data;
      split the parsed entity data of different file formats by applying a predefined process;
      separate, in response to split, data ingestion process from application processing interfaces;
      convert the parsed entity data of different file formats into a single file format by transforming each entity data from original file data to nodes and relations; and
      translate the single file formatted entity data into a graph database form for further processing and analysis.

5. The system according to claim 4, wherein the processor is further configured to:
   split and convert the parsed entity data of different file formats into a single JSON file format; and
   translate the single JSON file formatted entity data into the graph database form for further processing and analysis.

6. The system according to claim 4, wherein the predefined process includes applying custom apache NiFi processes, and the processor is further configured to:
   build a common datastore model for all data types;
   design and defining the NiFi process groups and workflows;
   enforce audit logging; and
   configure role based NiFi dashboard.

7. A non-transitory computer readable medium configured to store instructions for implementing an automatic data ingestion module for automatically making data ingestion agnostic to source format, wherein, when executed, the instructions cause a processor to perform the following:
- access a database that stores a plurality of entity data each having a different file format;
- configure each entity data accessed from the database via a communication network;
- configure each entity data from multiple data types without coding for each load;
- define a canonical entity model for common entities across line of businesses (LOBs);
- implement a common load process, common rules, data traceability process, audit capabilities, and a dashboard and automatically generate, in response to implement, a single framework and ingest data from the single framework;
- for each of LOB specific client visibility enforcement, personal information (P) data security enforcement, business model and data visibility, and change impact analysis, automatically generate and implement the defined canonical entity model;
- for each of data load process, data conversions/masking, data ingestion inside CPD (client profile data), and data load not impacting performance of API, implement modular and separate technology modules;
- ingest data independently, in response to implement modular and separate technology modules, regardless of other system failures;
- automatically parse each of the configured entity data;
- split the parsed entity data of different file formats by applying a predefined process;
- separate, in response to split, data ingestion process from application processing interfaces;
- convert the parsed entity data of different file formats into a single file format by transforming each entity data from original file data to nodes and relations; and
- translate the single file formatted entity data into a graph database form for further processing and analysis.

8. The non-transitory computer readable medium according to claim 7, wherein, when executed, the instructions further cause the processor to:
- split and convert the parsed entity data of different file formats into a single JSON file format; and
- translate the single JSON file formatted entity data into the graph database form for further processing and analysis.

9. The non-transitory computer readable medium according to claim 7, wherein the predefined process includes applying custom apache NiFi processes, and wherein, when executed, the instructions further cause the processor to:
- build a common datastore model for all data types;
- design and defining the NiFi process groups and workflows;
- enforce audit logging; and
- configure role based NiFi dashboard.

* * * * *